(12) United States Patent
Becker

(10) Patent No.: US 7,500,079 B2
(45) Date of Patent: Mar. 3, 2009

(54) DETECTION OF MEMORY LEAKS

(75) Inventor: Andrew James Becker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 11/496,109

(22) Filed: Jul. 31, 2006

(65) Prior Publication Data

US 2008/0028178 A1 Jan. 31, 2008

(51) Int. Cl.
*G06F 12/00* (2006.01)
(52) U.S. Cl. .................................................... 711/170
(58) Field of Classification Search ........................ None
See application file for complete search history.

(56) References Cited

U.S. PATENT DOCUMENTS

| | | | |
|---|---|---|---|
| 5,689,707 A * | 11/1997 | Donnelly | 707/206 |
| 5,842,019 A * | 11/1998 | Kolawa et al. | 717/130 |
| 5,953,530 A | 9/1999 | Rishi et al. | 717/127 |
| 6,560,773 B1 | 5/2003 | Alexander et al. | 717/128 |
| 6,658,652 B1 | 12/2003 | Axexander, III et al. | 717/128 |
| 6,782,462 B2 | 8/2004 | Marion et al. | 711/170 |
| 2002/0035676 A1* | 3/2002 | Weeks | 711/170 |
| 2003/0061597 A1* | 3/2003 | Curtis et al. | 717/128 |
| 2003/0163661 A1 | 8/2003 | Marion et al. | 711/170 |
| 2004/0078540 A1 | 4/2004 | Cirne et al. | 711/170 |
| 2004/0172579 A1 | 9/2004 | Fu | 714/47 |
| 2005/0076184 A1 | 4/2005 | Schumacher | 711/170 |
| 2005/0091646 A1 | 4/2005 | Chilimbi et al. | 717/130 |
| 2005/0235127 A1* | 10/2005 | Muthiah et al. | 711/170 |
| 2005/0240747 A1* | 10/2005 | Raut | 711/170 |
| 2005/0268286 A1 | 12/2005 | Obata et al. | 717/124 |
| 2007/0250820 A1* | 10/2007 | Edwards et al. | 717/131 |

FOREIGN PATENT DOCUMENTS

WO   WO9303435   2/1993

OTHER PUBLICATIONS

Qin, et al., "SafeMem: Exploiting ECC-Memory for Detecting Memory Leaks and Memory Corruption During Production Runs", © 2005 IEEE, p. 1-12.*
"Purify at a Glance", © Oct. 5, 2000, p. 1-4.*
De Pauw, et al., "Visualizing Reference Patterns for Solving Memory Leaks in Java", © 1999, p. 1-21.*
Mitchell, et al., "Leakbot: An Automated and Lightweight Tool for Diagnosing Memory Leaks in Large Java Applications", © 2003, p. 1-27.*
Xie and Aiken, "Context and Path sensitive Memory Leak Detection", Sep. 2005 http://glide.stanford.edu/yichen/research/leak.pdf.
Glowcode: Code Profiler and Memory Leak Detection Tool—Date is unknown http://www.codework.com/glowcode/product.html.
PCT Search Report dated Dec. 3, 2007 cited in International Application No. PCT/US2007/016440.

* cited by examiner

*Primary Examiner*—Brian R Peugh
(74) *Attorney, Agent, or Firm*—Merchant & Gould

(57) ABSTRACT

Embodiments are configured to manage memory, including detecting one or more memory leaks. The various embodiments are configured to detect memory leaks and/or associated data without adding extra space or overhead for each associated memory allocation as compared with current implementations. In an embodiment, memory is managed including the detection a memory leak by using a fixed memory overhead, such as a fixed block or buffer of N pointers, instead of adding extra space per memory allocation. The contents of the fixed block can be altered and used to detect when memory has been allocated but not freed based on an analysis of a polynomial associated with one or more allocation and free operations. The polynomial can be solved to determine leaked pointers under certain conditions.

13 Claims, 3 Drawing Sheets

DETECTION OF MEMORY LEAKS

BACKGROUND

Memory management has become a high priority in modern computing systems. Current memory management systems have the capability to dynamically allocate and deallocate memory. Many memory management systems utilize some type of a memory manager to manage memory operations, such as memory allocation and deallocation operations. For example, a memory manager can be used to free data from memory (e.g. a memory block) and to dedicate memory for use by a calling application. As part of a memory allocation operation, a memory manager may locate free memory and return a marker to a calling program which delineates the allocated memory. Calling programs typically include diagnostic tools which verify that memory distributed to the calling program is equal to an amount of memory that the program is aware of.

When finished with the memory, a calling program may return the allocated memory to the memory manager. Thereafter, the memory manager may free the memory. However, problems arise when a block of memory is not returned to the memory manager, such as when the calling application loses track of a memory allocation. This scenario is often referred to as a "memory leak" and is generally associated with some type of software bug or error. Some current memory management methods attempt to detect memory leaks by intentionally making each allocated block larger than asked for, and storing memory tracking data in the extra space of each allocated block. This adds overhead to the system. Such a method is commonly implemented for debug versions of a product, but not for release versions. Consequently, such an implementation can result in discrepancies between the behavior of the debug version and a ship version of the product, which can potentially hide bugs.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide for detecting one or more memory leaks. In an embodiment, memory is managed to detect memory leaks and/or associated data. The memory is managed to detect memory leaks and/or associated data without adding extra space or overhead for each associated memory allocation as compared with current memory managing implementations. In an embodiment, memory is managed to detect a memory leak by using a fixed memory overhead, such as a fixed block or buffer of N pointers, rather than adding extra space for each memory allocation.

In one embodiment, contents of the fixed block of N pointers can be altered and used to detect memory leaks as part of allocation and free operations. Accordingly, the fixed block can be used to determine when allocated memory has not been freed or released back to the system. In an embodiment, memory is managed to detect when memory has been allocated but not freed if more than N pointers have been allocated but not freed based on an analysis of a polynomial associated with one or more allocation and free operations. As a result, less memory is required as overhead to keep track of one or more memory leaks. Furthermore, fewer discrepancies may result between debug and ship versions, since the debug and ship versions may differ by, at a maximum, a single allocation of a fixed block of memory.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments provide for tracking and/or detecting one or more memory leaks, but are not so limited.

Figure 1:
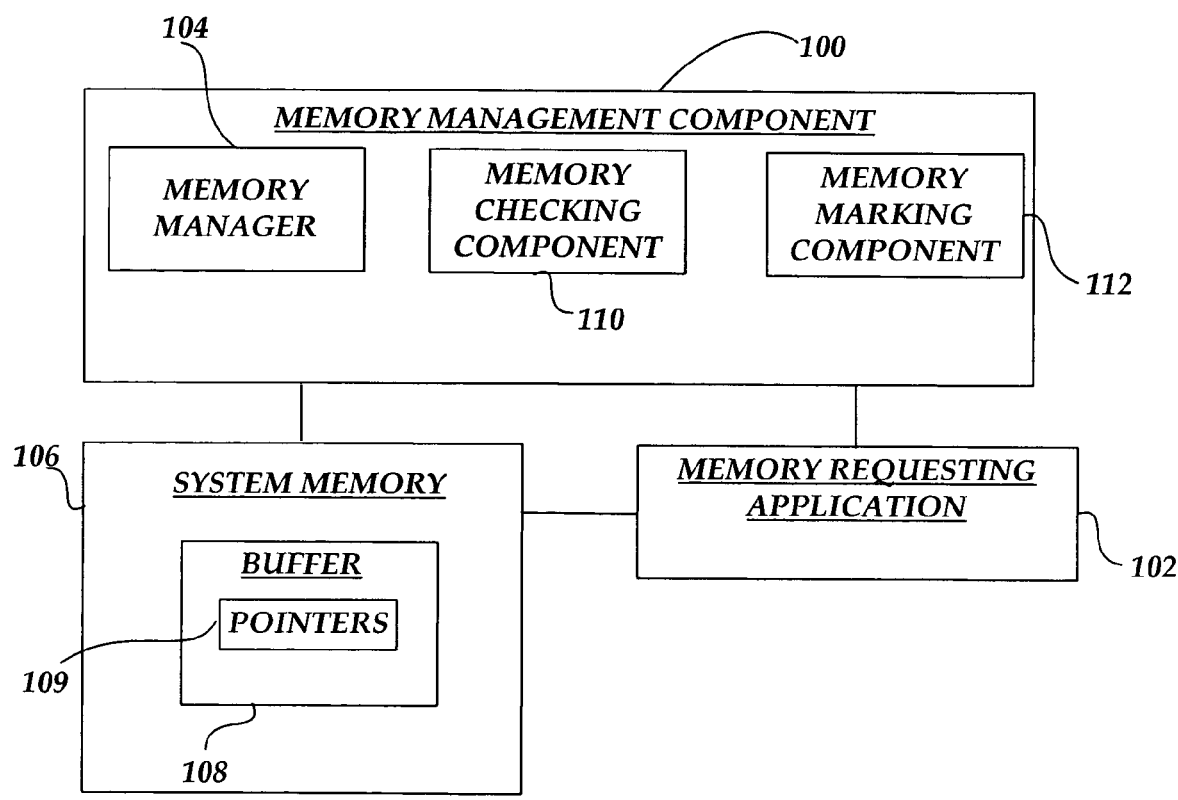
FIG. 1 depicts a block diagram of a memory management application, system memory, and a memory requesting application.

FIG. 1 depicts a block diagram of a memory management component 100, according to an embodiment. As described below, the memory management component 100 is configured and can be used to track and/or detect memory leaks. The memory management component 100 can also be configured to track data associated with a memory leak. The components described herein may be implemented in any combination of software, firmware, and/or hardware running on one or more processors, where the software may be stored on any suitable computer-readable medium. Various alternative embodiments may distribute one or more functions among any number and/or type of components, modules, and/or circuitry of or associated with the memory management component 100 or other system.

As described above, the memory management component 100 can be used to track and/or detect one or more memory leaks. For example, an application, such as the memory requesting application 102, can request one or more blocks of memory as part of one or more application operations. When the memory requesting application 102 no longer requires a memory block, it may release the memory block. As shown in FIG. 1, a memory manager 104 can be associated with the memory management component 100. While the memory manager 104 is shown to be included with the memory management component 100, in alternative embodiments, the memory manager 104 can be configured as a separate component with separate functionality. In one embodiment, the memory manager 104 can be included as part of the memory requesting application 102. In other alternative embodiments, the memory requesting application 102 can include the functionality of the memory manager 104 and/or one or more components of the memory management component 100. Other embodiments are available according to a desired implementation.

As described briefly above, when the application 102 no longer requires a memory block, the memory manager 104 is configured to release (also referred to as a "free" operation) the memory block back to system memory 106, which allows re-use of the memory block by the application 102 or some other application or operation. As shown in FIG. 1, the system memory 106 includes a buffer 108, which comprises a fixed amount of memory. The memory management component 100 can use the buffer 108 to track and/or detect one or more memory leaks, as described below. The buffer 108 can be implemented to include various amounts of memory according to a number of leaks to be detected. In alternative embodiments, the buffer 108 can be associated with other storage, such as flash memory or other memory for example.

As described above, there are situations in which the memory requesting application 102 can lose track of a memory block or operation, referred to as a "leak." In such a situation, the memory management component 100 can be used to detect the leak, but is not so limited. In an embodiment, the memory management component 100 can determine one or more leaks associated with one or more memory blocks by using its components in conjunction with the buffer 108 (hereinafter referred to as tracking block 108) and a number of pointers 109, described further below.

With continuing reference to FIG. 1, according to an embodiment, the memory management component 100 includes a memory checking component 110 and a memory marking component 112, but is not so limited. The memory checking component 110 is configured to track memory allocation and free operations. In an embodiment, the memory checking component 110 is configured to provide an output, such as a notification or other indication, regarding one or more unreturned memory blocks that the memory manager 104 has previously allocated. The memory marking component 112 is configured to inform the memory checking component 110 about known unreturned memory blocks, but is not so limited. The memory checking component 110 is also configured to output leak information in conjunction with the memory marking component 112, as described below. In alternative embodiments, the various components of the memory management component 100 can be separately configured and utilized individually as needed. In another embodiment, the various components can be combined as a single component, such as a single application or module for example.

As described above, the memory management component 100 can ascertain whether there are one or more leaks associated with one or more memory blocks by utilizing the tracking block 108, and a number of associated pointers 109. In an embodiment, each pointer 109 can comprise an n-bit number that is used with the buffer 108 to detect one or more memory leaks. In alternative embodiments, each pointer 109 can represent an object, such as a memory block, code, or other information. For example, each pointer 109 can be 32-bits (ranging in value from 0 to over 4 billion).

In an embodiment, each pointer 109 comprises a non-zero element in a Galois Extension Field. The Galois Extension Field may be used to remove a potential overflow condition when performing various operations used in conjunction with the tracking and/or detection of one or more memory leaks. Thus, as used in the description below, various mathematical operations are in accordance with the Galois Extension Field GF($2^{32}$) for 32-bit architectures, and Galois Extension Field GF($2^{64}$) for 64-bit architectures. However, the embodiments are not so limited.

In one embodiment, data associated with a leak can be tracked as well as one or more pointers 109, by expanding the size of a field associated with one or more pointers 109 of the tracking block 108. A restriction on the associated data is that it must be known at both the time of allocation and/or the time of freeing. For generic associated data, this may require an extra allocation per allocated pointer. However, certain data may be explicitly known at the time of an allocation and/or free operation, but may not be inferable from a leaked pointer. In such a circumstance, this data may be tracked with a fixed memory overhead (e.g. the maximum number of detectable leaks multiplied by the size of each pointer and its maximum associated data set).

Figure 2:
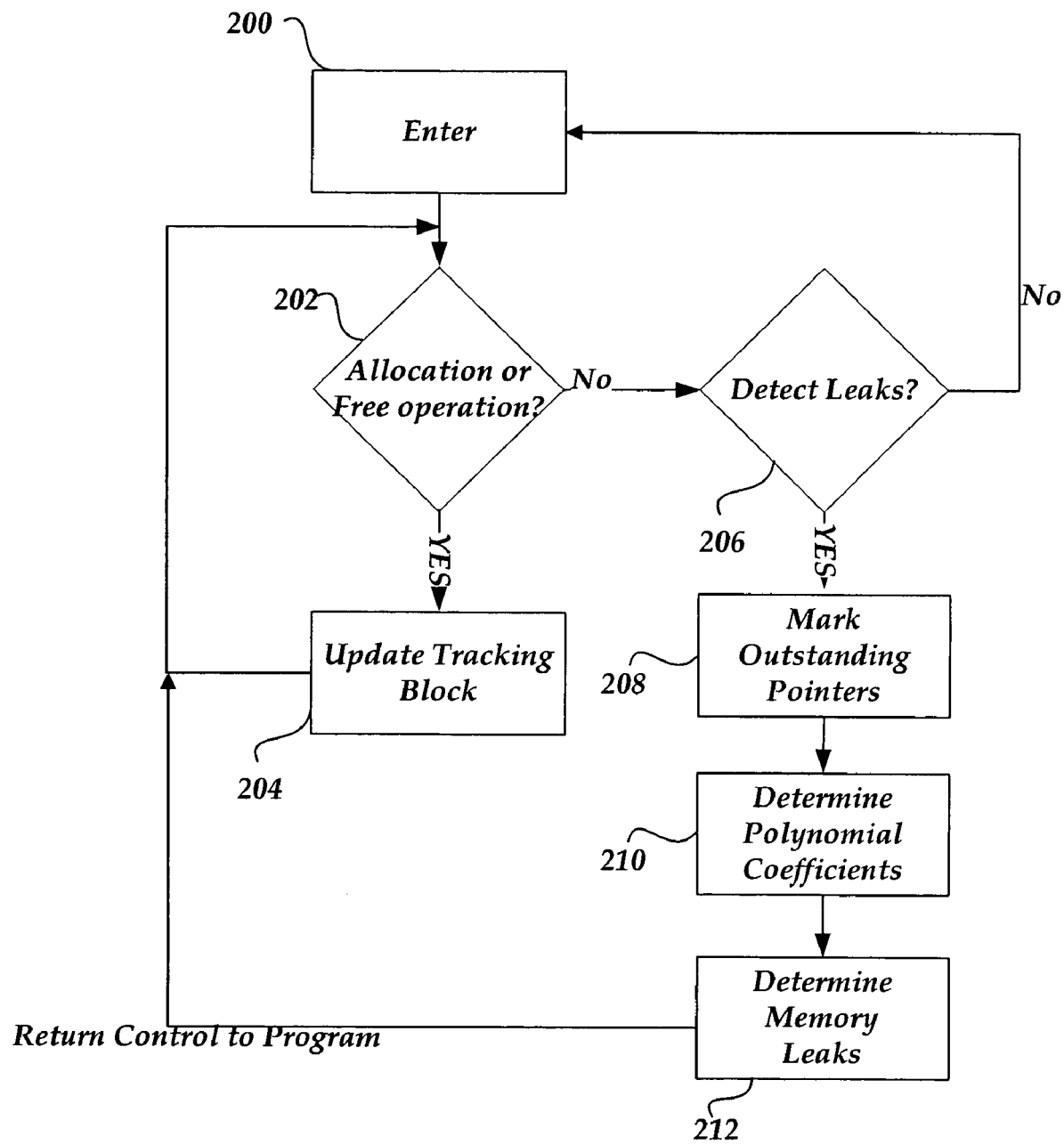
FIG. 2 is a flow diagram depicting a method determining one or more memory leaks.

FIG. 2 is flow diagram for determining if there are one or more memory leaks, under an embodiment. The components of FIG. 1 will be referenced in the description of FIG. 2. At 200, the flow begins. For example, an application, such as the memory requesting application 102 may be requesting a provision of an amount of memory based on an operation that requires the amount of memory. At 202, the memory manager 104 determines whether the operation is an allocation or free operation.

If the operation is an allocation or free operation, at 204, the memory manager 104 updates the tracking block 108 based on the type of operation (e.g. allocation, free, etc.) In an embodiment, the tracking block 108 of memory is allocated initially of a size "N" (where N is the maximum number of leaks that can be detected times a pointer size in bytes). The tracking block 108 is initially filled with zeros.

When the memory manager 104 is called to allocate or free a block of memory, the memory checking component 110 updates the contents of the tracking block 108 at 204. Under an embodiment, the tracking block 108 comprises a contiguous set of "N" numbers. Additionally, an allocated or freed pointer 109 comprises the number "X". In an embodiment, the memory checking component 110 is configured to add successive odd powers of X to the first N/2 (rounded up) numbers in the tracking block 108, and add successive negative odd powers of X to the remaining N/2 (rounded down) numbers in the tracking block 108.

For example, if N=5, add X to N[1], $X^3$ to N[2], $X^5$ to N[3], 1/X to N[4], and $1/X^3$ to N[5].

As further example, if N=9, then using a pointer "p":

$X1 = X1 + p$ $X2 = X2 + p*p*p$ $X3 = X3 + p*p*p*p*p$ $X4 = X4 + p*p*p*p*p*p*p$ $X5 = X5 + p*p*p*p*p*p*p*p*p$ $X6 = X6 + 1/p$ $$X7 = X7 + (1/p)*(1/p)*(1/p)$$

$$X8 = X8 + (1/p)*(1/p)*(1/p)*(1/p)*(1/p)$$

$$X9 = X9 + (1/p)*(1/p)*(1/p)*(1/p)*(1/p)*(1/p)*(1/p).$$

With continuing reference to FIG. 2, at 206, it is determined whether operations associated with detecting one or more leaks are to be executed. If leaks are not to be detected at this point, the flow returns to 200. If leaks are to be detected at this point, the flow proceeds to 208. For example, an application, such as the memory requesting application 102, may include code to request a detection process to detect whether there are any memory leaks. It will be appreciated that leak detection may occur at desired times and/or requested at times. As described below, the memory checking component 110 works in conjunction with the memory marking component 112 to detect one or more memory leaks.

The memory marking component 112 is configured to mark any known outstanding pointers associated with one or more memory operations. Once the memory marking component 112 has marked any known outstanding pointers at 208, the marked pointers are combined with the pointers determined by the memory checking component 110 at 204. At 210, and in accordance with an embodiment, the combination of pointers are then used at 210 by the memory checking component 110 to set-up and solve a specific linear equation, which will translate the tracking block values into coefficients of a polynomial. At 212, the memory checking component 110 can solve the polynomial (if solvable) to find the roots of the polynomial which correspond to the pointers associated with one or more lost memory blocks (leaks). If the pointers are zero at this point, such a condition corresponds with no memory leaks. On the other hand, if the polynomial is unsolvable, such a condition corresponds to a condition of more than N leaks. It will be appreciated that any number of methods can be used by the memory checking component 110 to solve for the roots of the polynomial.

An example scenario will be used to illustrate the operation of the memory management component 100 and its components described above. It will be appreciated that the method illustrated by the example below can be extended and/or restricted and applied in a similar manner. Table 1 below is an addition/subtraction table to be used in the example. Table 1 also serves as a subtraction table since "a+b"="a−b" in the Galois Extension Field. The numbers along the vertical axis and horizontal axis represent a number of pointers 109. Accordingly, there are 16 possible values of the pointers for this example.

TABLE 1

| + (or −) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 1 | 0 | 3 | 2 | 5 | 4 | 7 | 6 | 9 | 8 | 11 | 10 | 13 | 12 | 15 | 14 |
| 2 | 2 | 3 | 0 | 1 | 6 | 7 | 4 | 5 | 10 | 11 | 8 | 9 | 14 | 15 | 12 | 13 |
| 3 | 3 | 2 | 1 | 0 | 7 | 6 | 5 | 4 | 11 | 10 | 9 | 8 | 15 | 14 | 13 | 12 |
| 4 | 4 | 5 | 6 | 7 | 0 | 1 | 2 | 3 | 12 | 13 | 14 | 15 | 8 | 9 | 10 | 11 |
| 5 | 5 | 4 | 7 | 6 | 1 | 0 | 3 | 2 | 13 | 12 | 15 | 14 | 9 | 8 | 11 | 10 |
| 6 | 6 | 7 | 4 | 5 | 2 | 3 | 0 | 1 | 14 | 15 | 12 | 13 | 10 | 11 | 8 | 9 |
| 7 | 7 | 6 | 5 | 4 | 3 | 2 | 1 | 0 | 15 | 14 | 13 | 12 | 11 | 10 | 9 | 8 |
| 8 | 8 | 9 | 10 | 11 | 12 | 13 | 14 | 15 | 0 | 1 | 2 | 3 | 4 | 5 | 6 | 7 |
| 9 | 9 | 8 | 11 | 10 | 13 | 12 | 15 | 14 | 1 | 0 | 3 | 2 | 5 | 4 | 7 | 6 |
| 10 | 10 | 11 | 8 | 9 | 14 | 15 | 12 | 13 | 2 | 3 | 0 | 1 | 6 | 7 | 4 | 5 |
| 11 | 11 | 10 | 9 | 8 | 15 | 14 | 13 | 12 | 3 | 2 | 1 | 0 | 7 | 6 | 5 | 4 |
| 12 | 12 | 13 | 14 | 15 | 8 | 9 | 10 | 11 | 4 | 5 | 6 | 7 | 0 | 1 | 2 | 3 |
| 13 | 13 | 12 | 15 | 14 | 9 | 8 | 11 | 10 | 5 | 4 | 7 | 6 | 1 | 0 | 3 | 2 |
| 14 | 14 | 15 | 12 | 13 | 10 | 11 | 8 | 9 | 6 | 7 | 4 | 5 | 2 | 3 | 0 | 1 |
| 15 | 15 | 14 | 13 | 12 | 11 | 10 | 9 | 8 | 7 | 6 | 5 | 4 | 3 | 2 | 1 | 0 |

Table 2 below is a multiplication table to be used in the following example.

TABLE 2

| * | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 1 | 2 | 3 | 4 | 5 | 6 | 7 | 8 | 9 | 10 | 11 | 12 | 13 | 14 | 15 |
| 2 | 0 | 2 | 4 | 6 | 8 | 10 | 12 | 14 | 3 | 1 | 7 | 5 | 11 | 9 | 15 | 13 |
| 3 | 0 | 3 | 6 | 5 | 12 | 15 | 10 | 9 | 11 | 8 | 13 | 14 | 7 | 4 | 1 | 2 |
| 4 | 0 | 4 | 8 | 12 | 3 | 7 | 11 | 15 | 6 | 2 | 14 | 10 | 5 | 1 | 13 | 9 |
| 5 | 0 | 5 | 10 | 15 | 7 | 2 | 13 | 8 | 14 | 11 | 4 | 1 | 9 | 12 | 3 | 6 |
| 6 | 0 | 6 | 12 | 10 | 11 | 13 | 7 | 1 | 5 | 3 | 9 | 15 | 14 | 8 | 2 | 4 |
| 7 | 0 | 7 | 14 | 9 | 15 | 8 | 1 | 6 | 13 | 10 | 3 | 4 | 2 | 5 | 12 | 11 |
| 8 | 0 | 8 | 3 | 11 | 6 | 14 | 5 | 13 | 12 | 4 | 15 | 7 | 10 | 2 | 9 | 1 |
| 9 | 0 | 9 | 1 | 8 | 2 | 11 | 3 | 10 | 4 | 13 | 5 | 12 | 6 | 15 | 7 | 14 |
| 10 | 0 | 10 | 7 | 13 | 14 | 4 | 9 | 3 | 15 | 5 | 8 | 2 | 1 | 11 | 6 | 12 |
| 11 | 0 | 11 | 5 | 14 | 10 | 1 | 15 | 4 | 7 | 12 | 2 | 9 | 13 | 6 | 8 | 3 |
| 12 | 0 | 12 | 11 | 7 | 5 | 9 | 14 | 2 | 10 | 6 | 1 | 13 | 15 | 3 | 4 | 8 |
| 13 | 0 | 13 | 9 | 4 | 1 | 12 | 8 | 5 | 2 | 15 | 11 | 6 | 3 | 14 | 10 | 7 |
| 14 | 0 | 14 | 15 | 1 | 13 | 3 | 2 | 12 | 9 | 7 | 6 | 8 | 4 | 10 | 11 | 5 |
| 15 | 0 | 15 | 13 | 2 | 9 | 6 | 4 | 11 | 1 | 14 | 12 | 3 | 8 | 7 | 5 | 10 |

Tables 1 and 2 can be constructed as follows:

Given a prime power q=pn, a finite field "GF(q)" having q elements can be constructed as follows. First, select an irreducible polynomial f(T) of degree n with coefficients in GF(p). Such an f exists, knowing that the finite field GF(q) exists: use the minimal polynomial of any element that generates GF(q) over the subfield GF(p). Then GF(q)=GF(p)[T]/<f(T)>.

GF(p)[T] denotes the ring of all polynomials with coefficients in GF(p).

<f(T)> denotes the ideal generated by f(T).

The quotient is the set of polynomials with coefficients in GF(p) on division by f(T). See also "http://en.wikipedia.org/wiki/Galois_field."

The following illustrative example uses Tables 1 and 2, also referred to as transformation components, for the various mathematical operations described below. For example, as seen from Table 1 and 2: "3+5=6" and "7×11=4". Additionally, for this example, the tracking block 108 is represented as a static array of 3 numbers, herein referred to as "X", "Y", and "Z". X, Y, and Z can be used to detect and/or track at least 3 memory leaks. However, any size array may be used depending on the desired number of leaks to detect and/or track. Additionally, according to an embodiment, X, Y, and Z represent a running total of allocated pointers, their cubes, and their inverses. Initially, X, Y, and Z are set to zero.

According to this example, the pointer "5" is first allocated by the memory manager 104. As part of the pointer tracking, the memory checking component 110 adds the number 5 to X, so X is now equal to 5 (X=0+5=5). Using Table 2 above, the memory checking component 110 adds the cube of 5 to Y, so Y is now equal to 10 (Y=0+5*(5*5)=10). Again using Table 2, the memory checking component 110 adds the inverse of 5 to Z. Stated a different way, the inverse of 5 is the number that when multiplied by 5 results in 1, and according to Table 2, 11 is such a number. Thus, at this point: X=5, Y=10, and Z=11.

After the pointer "5" has been allocated, the pointer "6" is allocated by the memory manager 104. Using Table 1, the memory checking component 110 adds the number 6 to X, so X is now equal to 3 (X=5+6=3). Using Tables 1 and 2, the memory checking component 110 adds the cube of 6 to Y, so Y is now equal to 11 (Y=10+6*(6*6)=11). Again using Tables 1 and 2, the memory checking component 110 adds the inverse of 6 to Z. Z is now equal to 12 (Z=11+7=12). Thus, at this point: X=3, Y=11, and Z=12.

After the pointer "6" has been allocated, the pointer "13" is allocated by the memory manager 104. Using Table 1, the memory checking component 110 adds the number 13 to X, so X is now equal to 14 (X=3+13=14). Using Tables 1 and 2, the memory checking component 110 adds the cube of 13 to Y, so Y is now equal to 1 (Y=11+13*(13*13)=1). Using Tables 1 and 2, the memory checking component 110 adds the inverse of 13 to Z. Z is now equal to 8 (Z=12+4=8). Thus, at this point: X=14, Y=1, and Z=8.

After the pointer "13" has been allocated, the pointer "1" is allocated by the memory manager 104. Using Table 1, the memory checking component 110 adds the number 1 to X, so X is now equal to 15 (X=14+1=15). Using Tables 1 and 2, the memory checking component 110 adds the cube of 1 to Y, so Y is now equal to 0 (Y=1+1*(1*1)=0). Using Tables 1 and 2, the memory checking component 110 adds the inverse of 1 to Z. Z is now equal to 9 (Z=8+1=9). Thus, at this point: X=15, Y=0, and Z=9.

After the pointer "1" has been allocated, the pointer "11" is allocated by the memory manager 104. Using Table 1, the memory checking component 110 adds the number 11 to X, so X is now equal to 4 (X=15+11=4). Using Tables 1 and 2, the memory checking component 110 adds the cube of 11 to Y, so Y is now equal to 12 (Y=0+11*(11*11)=12). Again using Tables 1 and 2, the memory checking component 110 adds the inverse of 11 to Z. Z is now equal to 12 (Z=9+5=12). Thus, at this point: X=4, Y=12, and Z=12.

After the pointer "11" has been allocated, the pointer "10" is allocated by the memory manager 104. Using Table 1, the memory checking component 110 adds the number 10 to X, so X is now equal to 14 (X=4+10=14). Using Tables 1 and 2, the memory checking component 110 adds the cube of 10 to Y, so Y is now equal to 3 (Y=12+10*(10*10)=3). Again using Tables 1 and 2, the memory checking component 110 adds the inverse of 10 to Z. Z is now equal to 0 (Z=12+12=0). Thus, at this point: X=14, Y=3, and Z=0.

After the pointer "10" has been allocated, the pointer "9" is allocated by the memory manager 104. Using Table 1, the memory checking component 110 adds the number 9 to X, so X is now equal to 7 (X=14+9=7). Using Tables 1 and 2, the memory checking component 110 adds the cube of 9 to Y, so Y is now equal to 12 (Y=3+9*(9*9)=12). Again using Tables 1 and 2, the memory checking component 110 adds the inverse of 9 to Z. Z is now equal to 2 (Z=0+2=2). Thus, at this point: X=7, Y=12, and Z=2.

At this point, an application which has called on the memory manager 104 to allocate the pointers above, no longer requires pointer "10", and it is handed back to the memory manager 104 to free. Using Table 1, the memory checking component 110 subtracts the number 10 from X, so X is now equal to 13 (X=7−10=13). Recall that addition and subtraction are equivalent operations in this example. Using Tables 1 and 2, the memory checking component 110 subtracts the cube of 10 from Y, so Y is now equal to 3 (Y=12−10*(10*10)=3). Again using Tables 1 and 2, the memory checking component 110 subtracts the inverse of 10 from Z, and Z is now equal to 14 (Z=2−12=14). Thus, at this point: X=13, Y=3, and Z=14.

At this point, the application no longer requires pointer "6", so it is handed back to the memory manager 104 to free. Using Table 1, the memory checking component 10 subtracts the number 6 from X, so X is now equal to 11. Using Tables 1 and 2, the memory checking component 110 subtracts the cube of 6 from Y, so Y is now equal to 2. Again using Tables 1 and 2, the memory checking component 110 subtracts the inverse of 6 from Z, and Z is now equal to 9. Thus, at this point: X=11, Y=2, and Z=9.

The application also no longer requires pointer "13", so it is handed back to the memory manager 104 to free. Using Table 1, the memory checking component 110 subtracts the number 13 from X, so X is now equal to 6. Using Tables 1 and 2, the memory checking component 110 subtracts the cube of 13 from Y, so Y is now equal to 8. Again using Tables 1 and 2, the memory checking component 110 subtracts the inverse of 13 from Z, and Z is now equal to 13. Thus, at this point: X=6, Y=8, and Z=13.

After the pointer "13" has been freed, the application requests that the memory manager 104 allocate the pointer "8". Using Table 1, the memory checking component 110 adds the number 8 to X, so X is now equal to 14. Using Tables 1 and 2, the memory checking component 110 adds the cube of 8 to Y, so Y is now equal to 2. Again using Tables 1 and 2, the memory checking component 110 adds the inverse of 8 to Z, and Z is now equal to 2. Thus, at this point: X=14, Y=2, and Z=2.

At this point, the pointers 1, 5, 6, 8, 9, 10, 11, and 13 have been allocated. However, the pointers 6, 10, and 13 have been freed, leaving the outstanding pointers 1, 5, 8, 9, and 11. Stated another way, the unreturned memory blocks are 1, 5, 8, 9, and 11. At this point, it may be desirable to check for any leaks. In accordance with an embodiment, the memory marking component 112 can be used to mark all of the outstanding pointers. However, for this example, it is assumed that the application has a bug and has lost track of pointers 5, 8, and 11. Thus, the application only has knowledge of pointers 1 and 9.

As described below, the memory checking component 110 works in conjunction with the memory marking component 112 to determine if there are any leaks. The memory marking component 112 begins and uses a similar procedure as described above with X', Y', and Z' representing a running total of allocated pointers, their cubes, and their inverses which are initially set to zero (0) (X'=0, Y'=0, and Z'=0). Since the application only has knowledge of two outstanding pointers (1 and 0) the memory marking component 112 starts by marking pointer "1". Thus, similar to the procedure described above, the memory marking component 112 adds the number 1 to X', so X' is now equal to 1 (X'=0+1=1). Using Table 2, the memory marking component 112 adds the cube of 1 to Y', so Y' is now equal to 1 (Y'=0+1*(1*1)=1). Again, using Table 2, the memory marking component 112 adds the inverse of 1 to Z', and Z' is now equal to 1. Thus, at this point: X'=1, Y'=1, and Z'=1.

Moving to the remaining known outstanding pointer, "9", the memory marking component 112 marks pointer "9". Thus, the memory marking component 112 adds the number 9 to X', so X' is now equal to 8. Using Tables 1 and 2, the memory marking component 112 adds the cube of 9 to Y', so Y' is now equal to 14. Again using Tables 1 and 2, the memory marking component 112 adds the inverse of 9 to Z', and Z' is now equal to 3. Thus, at this point: X'=8, Y'=14, and Z'=3.

Since there are no further known outstanding pointers, the operations associated with memory marking component 112 are complete. Next, the X value (14), Y value (2), and Z value (2), resulting from the operations of the memory checking component 110 are combined with the X' value (8), Y' value (14), and Z' value (3) which resulted from the operations of the memory marking component 112. That is, X"=(14+8)=6, Y"=(2+14)=12, Z"=(2+3)=1. If X", Y", and Z" were each equal to zero (0), then there are no memory leaks. However, since X", Y", and Z", are nonzero, the memory checking component 110 recognizes that there is at least one memory leak.

To determine specific pointer information associated with a leak, under an embodiment, the memory checking component 110 sets up and solves a system of linear equations, which include, but are not limited to:

$$a = X'';$$

$$X'''b + c = X'''*X'''*X'' + Y''; \text{ and}$$

$$b + Z''*c = 0.$$

The memory checking component 110 plugs in the values of X", Y", and Z" above, resulting in:

$$a = 6;$$

$$6b + c = 13; \text{ and,}$$

$$b + c = 0.$$

The memory checking component 110 is configured to solve the system of linear equations. For example, the memory checking component 110 can use diagonalization and backsubstitution operations to solve the system of linear equations, which yields:

a=6, b=8, c=8. These values represent coefficients of a third-order polynomial which the memory checking component 110 is configured to create from the solution to the system of linear equations. The resulting polynomial is:

$x^3 + 6x^2 + 8x + 8$. It will be appreciated that the order of the polynomial is directly related to the number of leaks to be tracked and/or detected.

The memory checking component 110 is further configured to solve the polynomial and can in certain circumstances identify the lost pointers based on the solution. For example, the polynomial can be factored by algorithms and methodologies known to those skilled in the art, yielding the lost pointers 5, 8, and 11. That is, the solution to the polynomial results in the roots: 5, 8, and 11, which represent the lost pointers. That is, the exact pointers that were leaked can be determined. This solution can be easily checked: $(x+5)*(x+8)*(x+11) = x^3 + 6x^2 + 8x + 8$. It will be appreciated that the teachings of the example above can be extended to detect and/or track any number of memory leaks for permanent, temporary, and other memory architectures.

Other embodiments are contemplated. For example, the systems and methods described above may be used to track other objects, such as inventory, customer information, code revisions, etc., and other tangible and intangible items that may be represented by a unique number.

Exemplary Operating Environment

Figure 3:
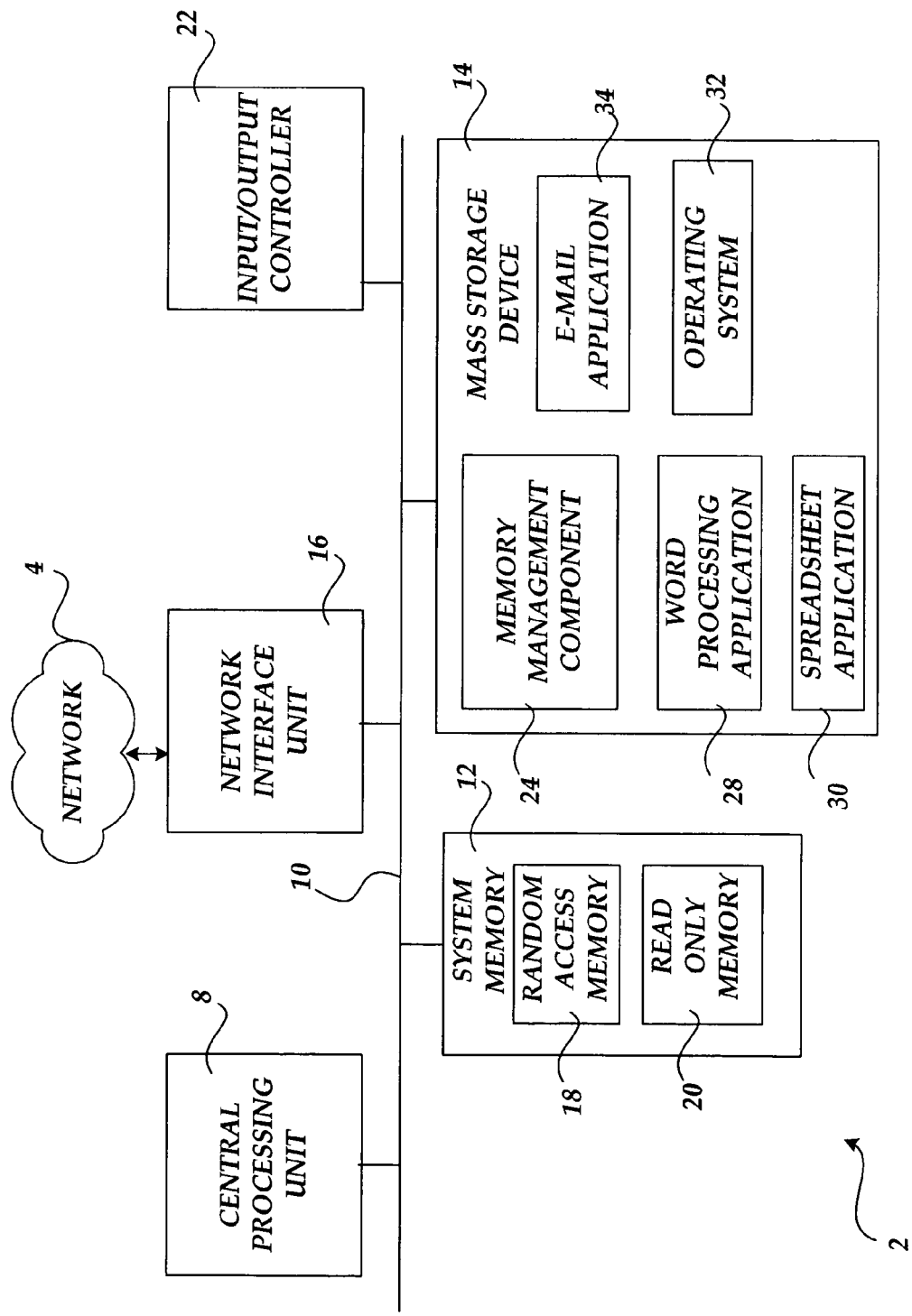
FIG. 3 is a block diagram illustrating a computing environment for implementation of various embodiments described herein.

Referring now to FIG. 3, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 3, an illustrative operating environment for embodiments of the invention will be described. As shown in FIG. 3, computer 2 comprises a general purpose desktop, laptop, handheld, or other type of computer capable of executing one or more application programs. In particular, according to the various embodiments, the computer 2 is operative to execute a memory management component 24, as described in detail above. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during start-up, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS XP operating system from MICROSOFT CORPORATION of Redmond, Wash. The mass storage device 14 and RAM 18 may also store one or more program modules. In particular, the mass storage device 14 and the RAM 18 may store a memory management component 24, as described above, and other components, such as a word processing application 28, a spreadsheet application 30, operating system 32, e-mail application 34, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A system for managing memory comprising:
   a tracking block of memory, wherein a number of tracking pointers are associated with the tracking block of memory;
   a memory marking component to mark at least one outstanding pointer associated with the tracking block of memory; and,
   a memory checking component to track at least one of a memory allocation operation and a memory free operation using the number of tracking pointers, wherein the memory checking component is to use information provided by the memory marking component and the number of tracking pointers to detect at least one memory leak, wherein the memory checking component is further configured to construct a polynomial based at least in part on the number of tracking pointers and the at least one outstanding pointer to detect the at least one memory leak.

2. The system of claim 1, wherein the memory checking component is further configured to solve the polynomial based to detect the at least one memory leak.

3. The system of claim 1, wherein the memory checking component is further configured to construct a polynomial based at least in part on a solution to a system of linear equations associated with the number of tracking pointers and the at least one outstanding pointer.

4. The system of claim 1, wherein each tracking pointer comprises a Galois Extension Field.

5. The system of claim 1, the tracking block further comprising a contiguous set of values and an allocated and freed pointer each comprise a number; and,
   wherein the memory checking component is further configured to add successive odd powers of the number to a first set of values in the tracking block, and add successive negative odd powers of the number to remaining values in the tracking block.

6. A method of managing memory comprising:
   marking at least one outstanding pointer associated with a tracking block of memory having a number of tracking pointers;
   tracking at least one of a memory allocation operation and a memory free operation using the number of tracking pointers;
   establishing a relationship to identify a memory leak, wherein the relationship is based at least in part on a solution to a system of equations; and,
   identifying the memory leak by using information provided by the at least one outstanding pointer and the number of tracking pointers.

7. The method of claim 6, further comprising constructing a polynomial based at least in part on the number of tracking pointers and the at least one outstanding pointer to identify the at least one memory leak.

8. The method of claim 7, further comprising constructing the polynomial based at least in part on a solution to a system of linear equations associated with the number of tracking pointers and the at least one outstanding pointer.

9. The method of claim 7, further comprising solving the polynomial to identify the at least one memory leak.

10. The method of claim 6, further comprising adding successive odd powers of a number to a first set of values in the tracking block, and adding successive negative odd powers of the number to remaining values in the tracking block.

11. The method of claim 6, further comprising representing the tracking pointers and the at least one outstanding pointer with a Galois Extension Field.

12. A computer readable medium including executable instructions which, when executed, manage memory by:

identifying at least one outstanding pointer associated with a number of tracking pointers;

tracking a memory operation using the number of tracking pointers;

establishing a relationship to identify a memory leak, wherein the relationship is based at least in part on a solution to a system of equations associated with the outstanding pointer and the number of tracking pointers; and, detecting the memory leak by using information provided by the at least one outstanding pointer and the number of tracking pointers.

13. The computer-readable medium of claim 12, wherein the instructions, when executed, manage memory by constructing a polynomial based at least in part on the solution to the system of equations.

* * * * *